United States Patent
Lin (10) Patent No.: US 8,995,458 B1
(45) Date of Patent: *Mar. 31, 2015

(54) METHOD AND APPARATUS FOR DELAY JITTER REDUCTION IN NETWORKING DEVICE

(71) Applicant: Marvell International Ltd., Hamilton (BM)

(72) Inventor: Alex Chung Chun Lin, Saratoga, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/258,318

(22) Filed: Apr. 22, 2014

Related U.S. Application Data (63) Continuation of application No. 13/020,270, filed on Feb. 3, 2011, now Pat. No. 8,705,552.

(60) Provisional application No. 61/302,844, filed on Feb. 9, 2010.

(51) Int. Cl.
*H04L 12/54* (2013.01)
*G01R 31/08* (2006.01)
*H04L 12/875* (2013.01)

(52) U.S. Cl.
CPC .................................... *H04L 47/562* (2013.01)
USPC .......................................... 370/428; 370/235

(58) Field of Classification Search
None
See application file for complete search history.

(56) References Cited

U.S. PATENT DOCUMENTS

| | | |
|---|---|---|
| 6,483,845 B1 | 11/2002 | Takeda et al. |
| 6,751,194 B1 | 6/2004 | Ueno |
| 7,633,870 B2 | 12/2009 | Elliot |
| 7,965,644 B2 | 6/2011 | Chang et al. |
| 8,170,022 B2 | 5/2012 | Tychon et al. |
| 8,194,544 B2 | 6/2012 | Smith et al. |
| 2001/0008530 A1 | 7/2001 | Okamoto |
| 2007/0183326 A1 | 8/2007 | Igarashi et al. |
| 2007/0297414 A1 | 12/2007 | Gupta et al. |
| 2008/0181112 A1 | 7/2008 | Beck et al. |
| 2009/0172552 A1 | 7/2009 | Segel |
| 2009/0245104 A1 | 10/2009 | Nishimura et al. |

*Primary Examiner* — Hassan Phillips
*Assistant Examiner* — Hicham Foud (57) ABSTRACT

A networking device reduces delay jitter of a plurality of packets passing through the networking device. The networking device includes an input interface that receives a first packet, a packet memory that stores the first packet, a timestamp module, an egress module, and an output interface. The timestamp module generates a first timestamp corresponding to when the first packet was received. The egress module stores a first output time corresponding to the first packet. The first output time is a sum of the first timestamp and a fixed time interval. The fixed time interval is a difference between an amount of time required to receive a maximum-sized packet and an amount of time required to receive a minimum-sized packet. The output interface is configured to transmit the first packet to a destination networking device in response to a current timestamp being greater than or equal to the first output time.

20 Claims, 11 Drawing Sheets

METHOD AND APPARATUS FOR DELAY JITTER REDUCTION IN NETWORKING DEVICE

CROSS-REFERENCE TO RELATED APPLICATIONS

This disclosure is a Continuation of U.S. patent application Ser. No. 13/020,270 (now U.S. Pat. No. 8,705,552), filed Feb. 3, 2011 which claims the benefit of U.S. Provisional Patent Application Ser. No. 61/302,844, entitled "Method and Apparatus to Reduce and Bound Latency Variations of Packet Entering a Node in the Packet Switched Network," filed Feb. 9, 2010, the disclosure thereof incorporated by reference herein in its entirety.

FIELD

The present disclosure relates generally to packet data communications. More particularly, the present disclosure relates to controlling latency variations in a packet node.

BACKGROUND

As more media and real-time traffic are being sent across packet-switched networks, enforcing deterministic throughput and delay characteristics in the network nodes has become a necessity to the future success of such networks. Variations in throughput and delay in a packet-switched network can arise due to numerous factors such as differences in packet processing time, the number of interfering flows, and the type of queuing and scheduling algorithms deployed. These factors are just a few examples, and are not meant to be all-inclusive. While allowing such variations to exist in the network enables higher bandwidth utilization and lowers system cost, the variations are problematic for transporting media and real-time streams. Media streams such as video or music feeds tend to average to a relatively constant bit rate over a given period of time. Typically a media receiver will implement some amounts of buffering, allowing it to tolerate a certain bounded rate and delay jitter during transmission. However, excessive burstiness inevitably leads to overflow or underflow in the receiving buffer. When this happens, the video or music may appear to stop, skip, or be choppy. The discontinuity during a visual or audible experience is unpleasant and unacceptable for human users.

SUMMARY

In general, in one aspect, an embodiment features an apparatus comprising: a packet ingress interface to ingress packets of data into the apparatus; a packet egress interface to egress the packets from the apparatus; an eligible egress time module to determine a respective eligible egress time for each of the packets based on a respective ingress time of the packet at the packet ingress interface and a hold interval; and an egress module to prevent each packet from egressing the packet egress interface until occurrence of the respective eligible egress time.

In general, in one aspect, an embodiment features a method comprising: ingressing packets of data into an apparatus; egressing the packets from the apparatus; determining a respective eligible egress time for each of the packets based on a respective ingress time of the packet and a hold interval; and preventing each packet from egressing the apparatus until occurrence of the respective eligible egress time.

In general, in one aspect, an embodiment features computer-readable media embodying instructions executable by a computer to perform a method comprising: determining respective eligible egress time for packets ingressed into an apparatus based on a respective ingress time of the packet and a hold interval; and preventing each packet from egressing the apparatus until occurrence of the respective eligible egress time.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Figure 1:
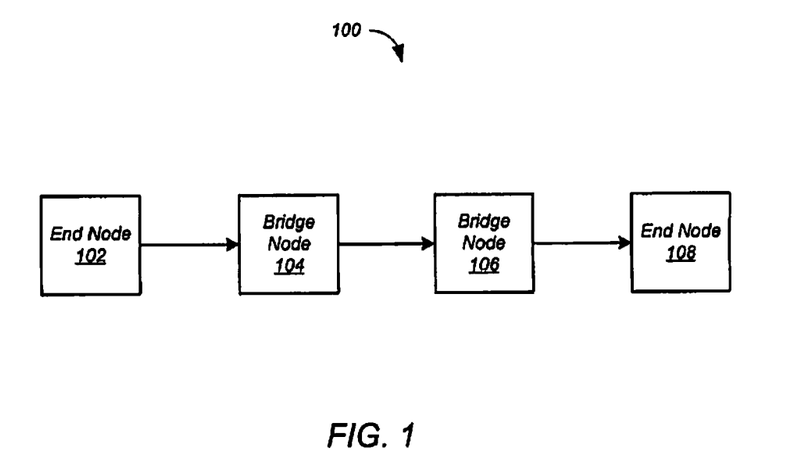
FIG. 1 shows a simple end-to-end path in a packet switched network.

The subject matter of the present disclosure relates to controlling latency variations in a packet switch. FIG. 1 shows a simple end-to-end path 100 in a packet switched network. Path 100 includes an end node 102 that is the source of the packets, bridge nodes 104 and 106 that receive and forward the packets, and an end node 108 that is the destination of the packets. Embodiments of the present disclosure can be implemented in any of the nodes in path 100, including end nodes 102 and 108 and bridge nodes 104 and 106. Furthermore, while embodiments of the present disclosure are discussed in the context of packet-switched networks such as local-area networks (LAN) and the like, the techniques described herein can be applied to other sorts of communication paths such as direct links and the like.

Embodiments of the present disclosure reduce and bound the delay jitter of a packet in a packet switch by implementing a constant latency for each packet as it passes through a node in a packet switched network. Some embodiments also compensate for latency variations incurred in the immediately previous node. For example, referring again to FIG. 1, bridge node 106 can compensate not only for latency variations in bridge node 106, but also for latency variations in bridge node 104.

Figure 2:
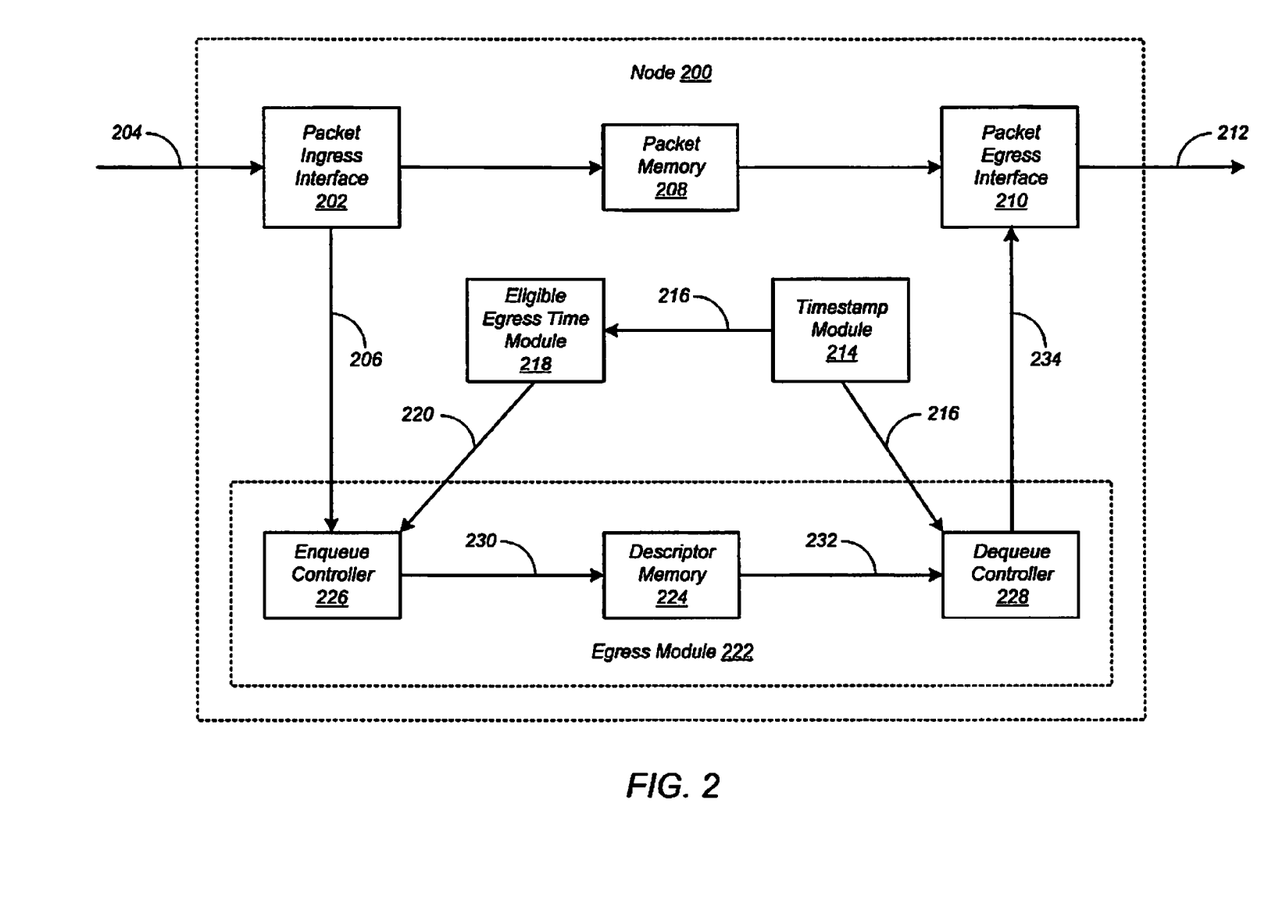
FIG. 2 shows elements of a node according to one embodiment.

FIG. 2 shows elements of a node 200 according to one embodiment. Node 200 can be implemented within a network device such as a packet switch, a bridge, a router, a network interface controller (NIC), and the like. Although in the described embodiments the elements of node 200 are presented in one arrangement, other embodiments may feature other arrangements. For example, elements of node 200 can be implemented in hardware, software, or combinations thereof. As another example, while node 200 is implemented as a store-and-forward type of node, node 200 can be implemented as other types of nodes instead.

Referring to FIG. 2, node 200 includes a packet ingress interface 202 to ingress packets of data at 204 into node 200, and to generate a respective descriptor at 206 for each packet. Node 200 also includes a packet memory 208 to store the packets, and a packet egress interface 210 to egress packets of data at 212 from node 200.

Node 200 also includes a timestamp module 214 to generate timestamps at 216. Each timestamp represents the current time. Node 200 also includes an eligible egress time module 218 to determine a respective eligible egress time at 220 for each packet based on a respective ingress time of the packet at packet ingress interface 202 and a hold interval. Eligible egress time module 218 determines each ingress time according to the timestamp generated upon ingress of the respective packet. The ingress time of a packet can be the time of receipt of the start-of-packet (SOP), first byte (or a derived equivalent) of the packet, or the like. In some embodiments, each eligible egress time is the sum of the respective ingress time and the hold interval.

Node 200 also includes an egress module 222 to prevent each packet from egressing node 200 at packet egress interface 210 until occurrence of the respective eligible egress time. Egress module 222 includes a descriptor memory 224, an enqueue controller 226, and a dequeue controller 228. Enqueue controller 226 writes each descriptor at 230 to descriptor memory 224 at an address selected according to the respective eligible egress time. Dequeue controller 228 reads the descriptors at 232 from descriptor memory 224 at addresses selected according to the timestamps generated at 216 by timestamp module 214. Packet egress interface 210 egresses packets from packet memory 208 according to the descriptors at 234 read by dequeue controller 228 from descriptor memory 224.

Figure 3:
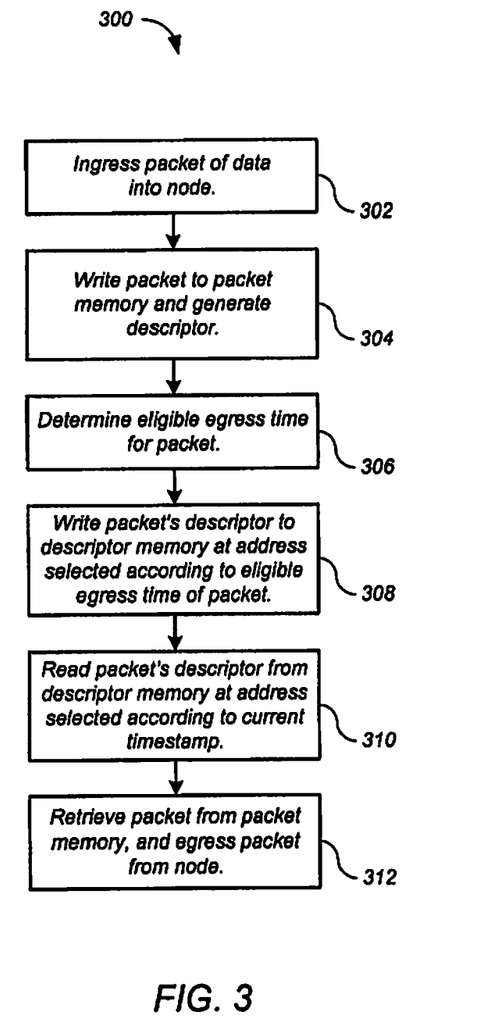
FIG. 3 shows a process for the node of FIG. 2 according to one embodiment.

FIG. 3 shows a process 300 for node 200 of FIG. 2 according to one embodiment. Although in the described embodiments the elements of process 300 are presented in one arrangement, other embodiments may feature other arrangements. For example, in various embodiments, some or all of the steps of process 300 can be executed in a different order, concurrently, and the like.

For clarity, process 300 describes the processing of one packet through node 200. Other packets are processed in a similar manner. Referring to FIG. 3, at 302, packet ingress interface 202 ingresses a packet of data into node 200. The packet can be ingressed from another node over a network connection, from a higher-level entity, or the like. At 304, packet ingress interface 202 writes the packet to packet memory 208, and generates a descriptor for the packet. The descriptor is passed to egress module 222.

At 306, eligible egress time module 218 determines an eligible egress time for the packet. The eligible egress time is passed to egress module 222. The eligible egress time is based on the ingress time of the packet at packet ingress interface 202 and a hold interval Thold. In some embodiments, each eligible egress time is the sum of the respective ingress time and the hold interval.

Eligible egress time module 218 determines the ingress time according to the timestamp generated by timestamp module 214 upon ingress of the packet. Timestamp module 214 generates the timestamps periodically, with a programmable period Tper. The timestamp value is incremented at the start or end of each period. Hold interval Thold may be a constant, programmable, or dynamically computed value. There can be one or more Thold settings in a node. A Thold setting may apply to a single packet or set of packets, a stream or set of streams, traffic class or set of classes, or globally. In some embodiments, hold interval Thold can be selected to be greater than the time required to receive one maximum-sized packet. In some embodiments, hold interval Thold is computed according to a jitter of an immediately upstream node that is sending the packets.

Egress module 222 prevents the packet from egressing packet egress interface 210 until occurrence of the packet's eligible egress time. In particular, at 308, enqueue controller 226 writes the packet's descriptor to descriptor memory 224 at an address selected according to the eligible egress time of the packet. Dequeue controller 228 reads the descriptors from descriptor memory 224 at addresses selected according to the timestamps generated by timestamp module 214. Therefore, when timestamp module 214 generates a timestamp equal to, or greater than, the eligible egress time of the packet, at 310 dequeue controller 228 reads the packet's descriptor from descriptor memory 224. The packet's descriptor is passed to packet egress interface 210.

Packet egress interface 210 egresses packets from packet memory 208 according to the descriptors read by dequeue controller 228. Therefore, at 312, in response to receiving the packet's descriptor from egress module 222, packet egress interface retrieves the packet from packet memory 208, and egresses the packet from node 200.

Figure 4:
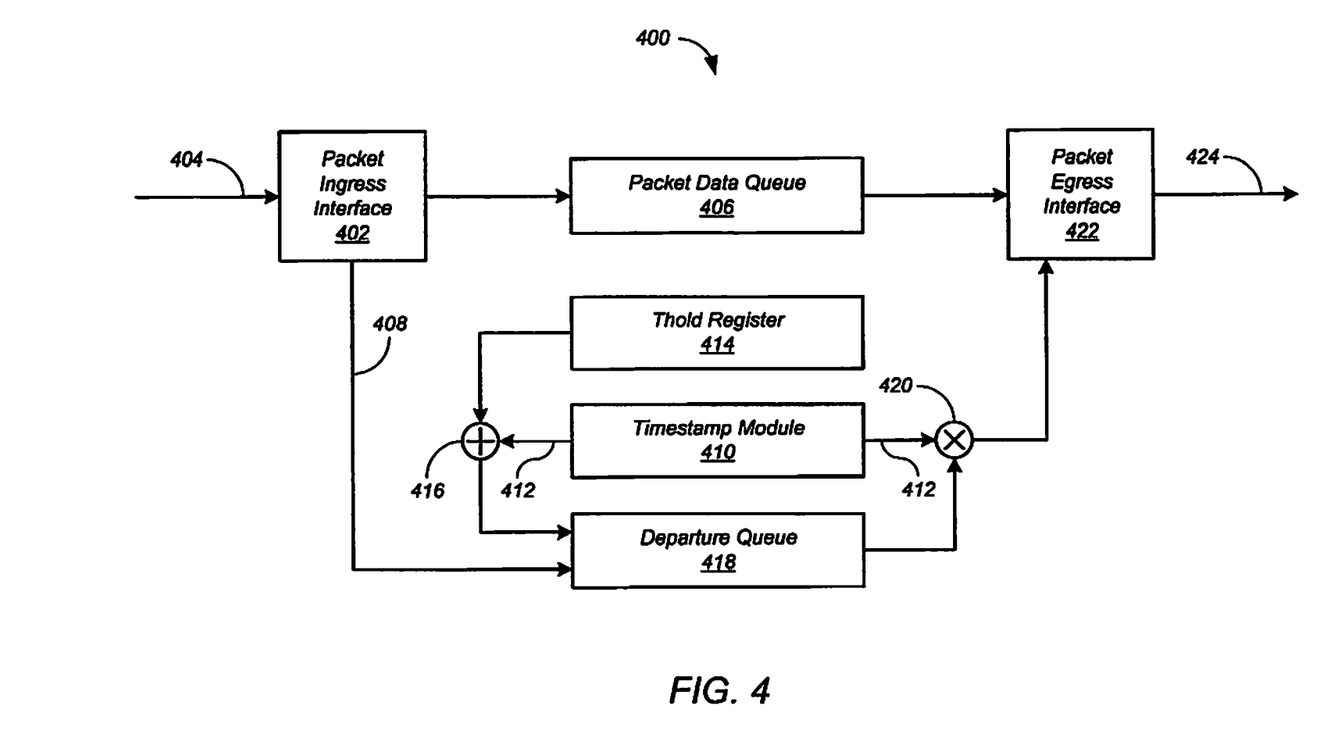
FIG. 4 shows an implementation featuring a departure queue according to one embodiment.

FIG. 4 shows an implementation 400 featuring a departure queue according to one embodiment. A packet ingress interface 402 ingresses packets at 404, stores the packets in a packet data queue 406, and generates a descriptor for each packet at 408. A timestamp module 410 generates timestamps at 412. A register 414 stores hold interval Thold. An adder 416 adds the hold interval Thold to the current timestamp, thereby generating an eligible egress time for the packet. The descriptor, along with the eligible egress time, are placed in a departure queue 418.

Each packet is processed and kept ready, but remains waiting in packet data queue 406 until its eligible egress time. The processing time for a packet can vary greatly. For example, the processing time can be very short when retrieving a packet from an on-chip memory, or can be long if requiring arbitration for transmission to an off-chip memory or device. If hold interval Thold is selected to be at least equal to, or greater than, the maximum processing time to ready any packet for transmission after being scheduled, then the output jitter is bounded to timestamp period Tper.

As an example, in a store and forward architecture, Thold can be set according to equation (1), where Tmax is the time required to receive a maximum-sized packet, Tmin is the time required to receive a minimum-sized packet, and any decimal result from the division is truncated.

$$T\text{hold} = (T\text{max} - T\text{min})/T\text{per} - 1 \qquad (1)$$

In this example, the receive jitter is reduced from (Tmax−Tmin) to Tper. If the maximum and minimum packet sizes are 1522 and 64 bytes, respectively, on a gigabit link, then Tmax and Tmin are 12,176 ns and 512 ns, respectively. Given Tper=625 ns, the input jitter is reduced from 11,264 ns (12,176 ns-512 ns) down to 625 ns.

As another example, if the jitter incurred by the packet in the previous node can be obtained, then Thold may be computed to compensate for that jitter. In this application, Thold is calculated to be the target delay Dlocal through current node plus the target departure time DTStarget of the previous node minus the actual departure time DTSactual of the previous node divided by Tper of the current node plus one, as given by equation (2), such that the final result is a non-negative number.

$$\text{Thold}=\text{Dlocal}+(DT\text{Starget}-DT\text{Sactual})/T\text{per}+1 \quad (2)$$

In the case where result is negative, a minimum positive value or zero value is assigned instead. Alternatively, Dlocal may be intentionally made larger to increase compensation for late transmission from the previous node (DTSactual>DTStarget).

Returning to FIG. 4, a comparator 420 compares the current timestamp to the eligible egress time for the descriptor at the head of departure queue 418. On occurrence of the eligible egress time for a packet, the packet's descriptor is removed from departure queue 418, and is passed to a packet egress interface 422. In response to the descriptor, packet egress interface 422 retrieves the respective packet from packet data queue 406, and egresses the packet at 424.

Figure 5:
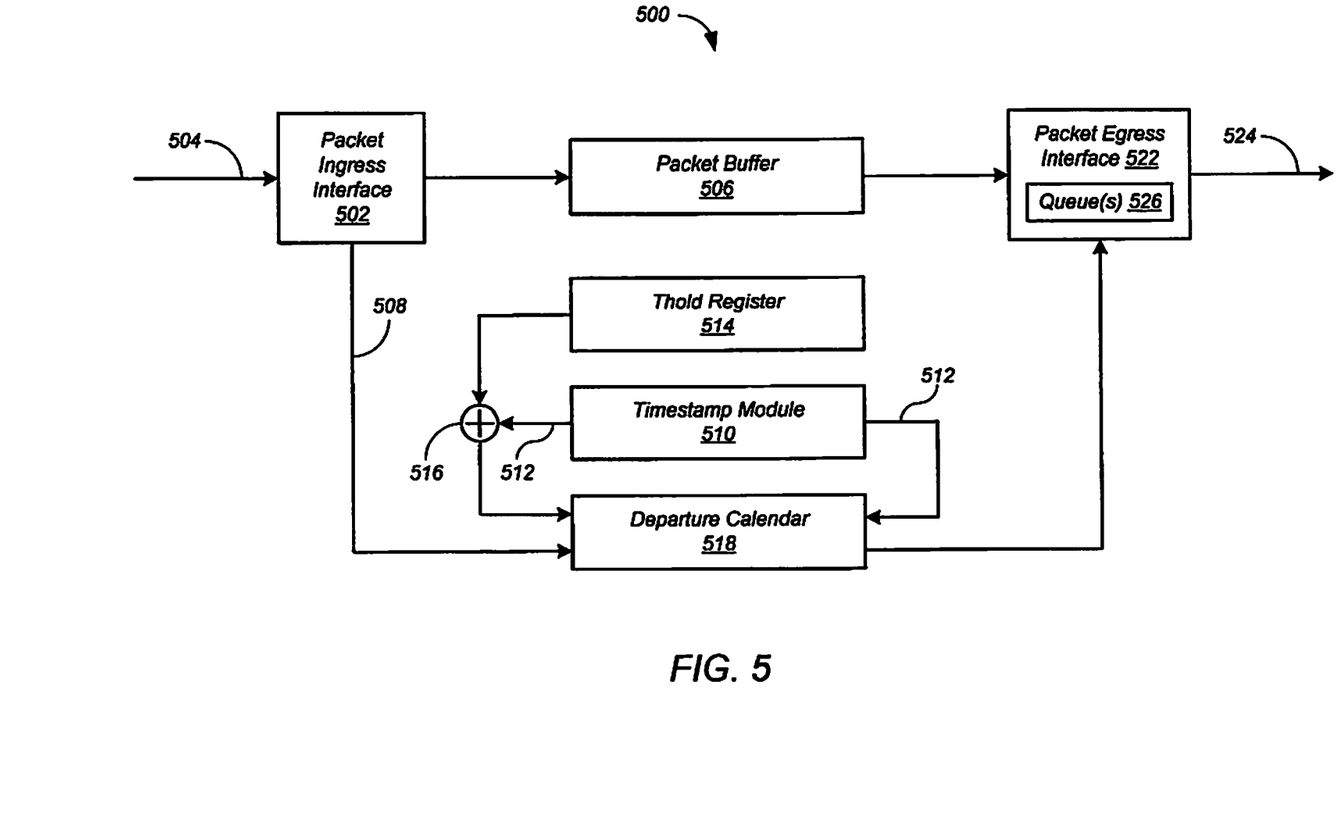
FIG. 5 shows an implementation featuring a departure calendar according to one embodiment.

FIG. 5 shows an implementation 500 featuring a departure calendar according to one embodiment. A packet ingress interface 502 ingresses packets at 504, stores the packets in a packet buffer 506, and generates a descriptor for each packet at 508. A timestamp module 510 generates timestamps at 512. A register 514 stores hold interval Thold. An adder 516 adds the hold interval Thold to the current timestamp, thereby generating an eligible egress time for the packet. The descriptor, along with the eligible egress time, are passed to a departure calendar 518.

Each packet is processed and kept ready, but remains waiting in packet buffer 506 until its eligible egress time. On occurrence of the eligible egress time for a packet, the packet's descriptor is removed from departure calendar 518, and is passed to a packet egress interface 522, which can include one or more output queues 526. In response to the descriptor, packet egress interface 522 retrieves the respective packet from packet buffer 506, and places the packet in an output queue 526. Egress interface 522 subsequently egresses the packet at 524.

Figure 6:
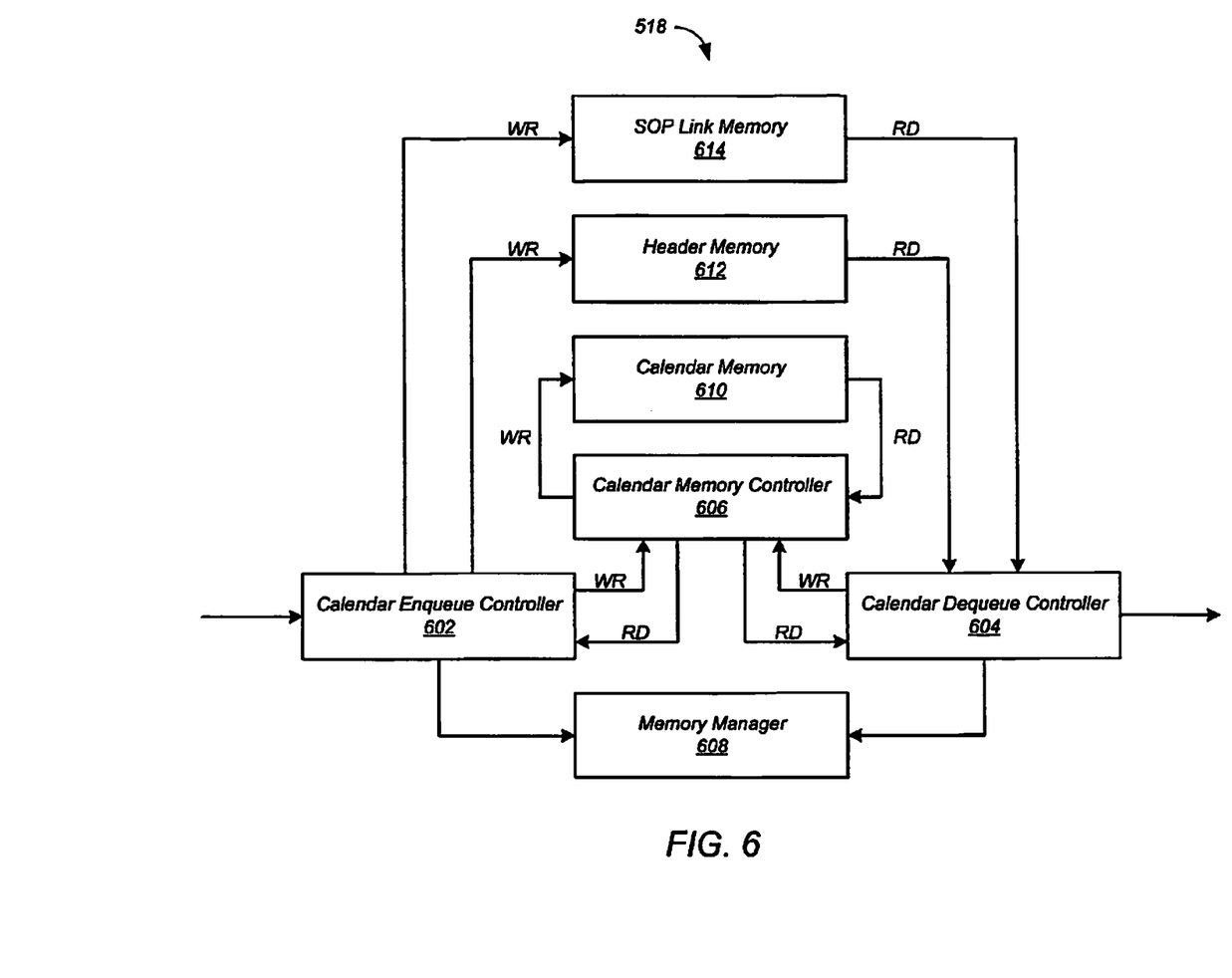
FIG. 6 shows an implementation of the departure calendar of FIG. 5 according to one embodiment.

FIG. 6 shows an implementation of departure calendar 518 of FIG. 5 according to one embodiment. Departure calendar 518 includes a calendar enqueue controller 602, a calendar dequeue controller 604, a calendar memory controller 606, a memory manager 608, a calendar memory 610, a header memory 612, and a start-of-packet (SOP) link memory 614.

Figure 7:
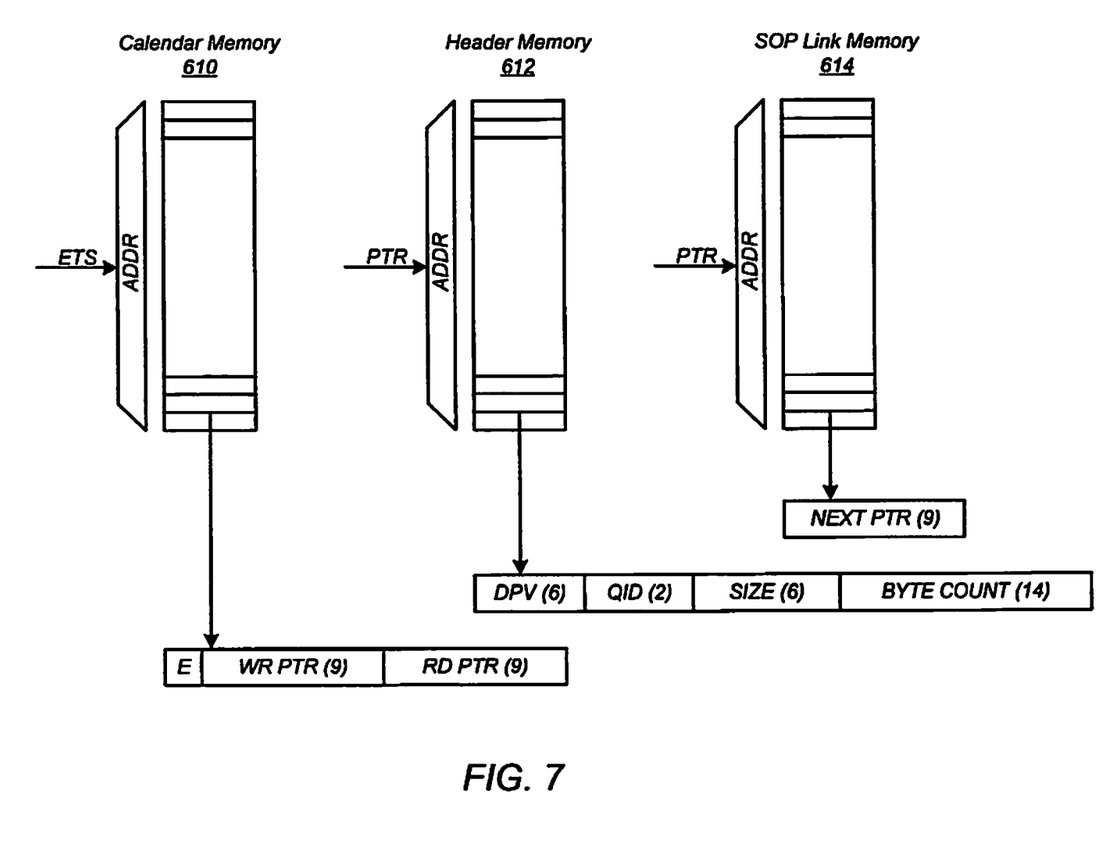
FIG. 7 shows detail of the memories of FIG. 6 according to one embodiment.

FIG. 7 shows detail of memories 610, 612, and 614 of FIG. 6 according to one embodiment. Calendar memory 610 is a 128×19 memory that is addressed by the eligible egress time ETS. Each entry in calendar memory 610 includes an empty flag E, a 9-bit write pointer WR PTR, and a 9-bit read pointer RD PTR. Header memory 612 is a 512×29 memory that is addressed by a pointer PTR. Each entry in header memory 612 includes a 6-bit destination port vector DPV that indicates a destination port for the respective packet, a 2-bit queue identifier QID that identifies the queue to which the packet belongs, a 6-bit SIZE indicating the size of the packet, and a 14-bit BYTE COUNT indicating the number of bytes in the packet. SOP link memory 614 is a 512×9 memory that is addressed by pointer PTR. Each entry in SOP link memory 614 includes a 9-bit pointer NEXT PTR.

Figure 8:
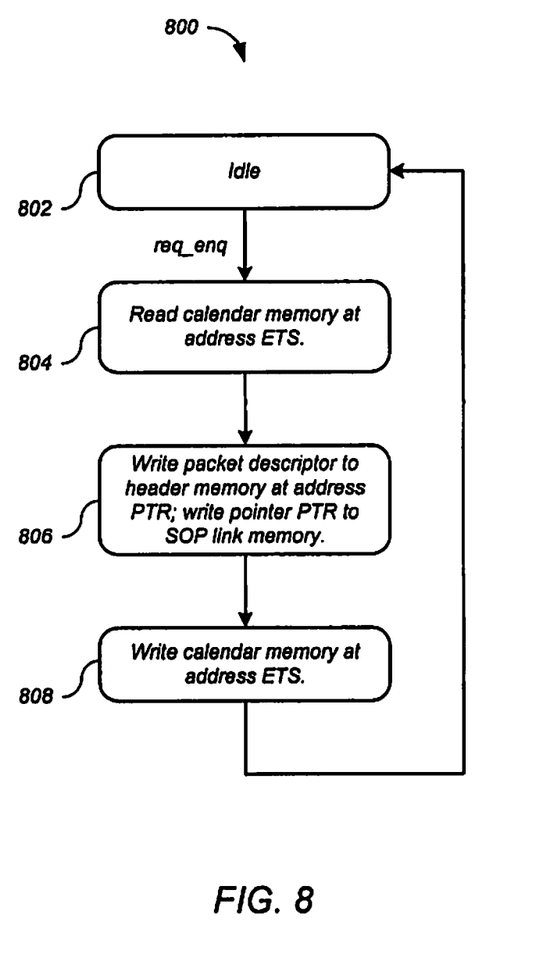
FIG. 8 shows an enqueue state machine implemented by the calendar enqueue controller of FIG. 6 according to one embodiment.

FIG. 8 shows an enqueue state machine 800 implemented by calendar enqueue controller 602 of FIG. 6 according to one embodiment. In an idle state 802, enqueue controller 602 waits for an enqueue request (req-enq) to arrive from packet ingress interface 502. When an enqueue request for a packet arrives, state machine 800 moves to state 804, where enqueue controller 602 reads calendar memory 610 at address ETS, which represents the eligible egress time for the packet.

State machine 800 then moves to state 806, where the entry read in state 804 is returned to enqueue controller 602. Enqueue controller 602 writes the packet descriptor to header memory 612 at address PTR, where PTR indicates the location in packet buffer 506 where the first byte of the packet is stored. Enqueue controller 602 also writes pointer PTR to SOP link memory 614 at an address location selected according to the value of empty flag E read in state 804. If E=1, indicating that the entry is empty, address PTR is selected. If E=0, indicating that the entry is not empty, address WR PTR is selected.

State machine 800 then moves to state 808, where enqueue controller 602 writes calendar memory 610 at address ETS with values selected according to the value of empty flag E read in state 804. If E=1, the values are E=0, WR PTR=PTR, and RD PTR=PTR. If E=0, the values are E=0, WR PTR=PTR, RD PTR=RD PTR. State machine 800 then returns to idle state 802.

Figure 9:
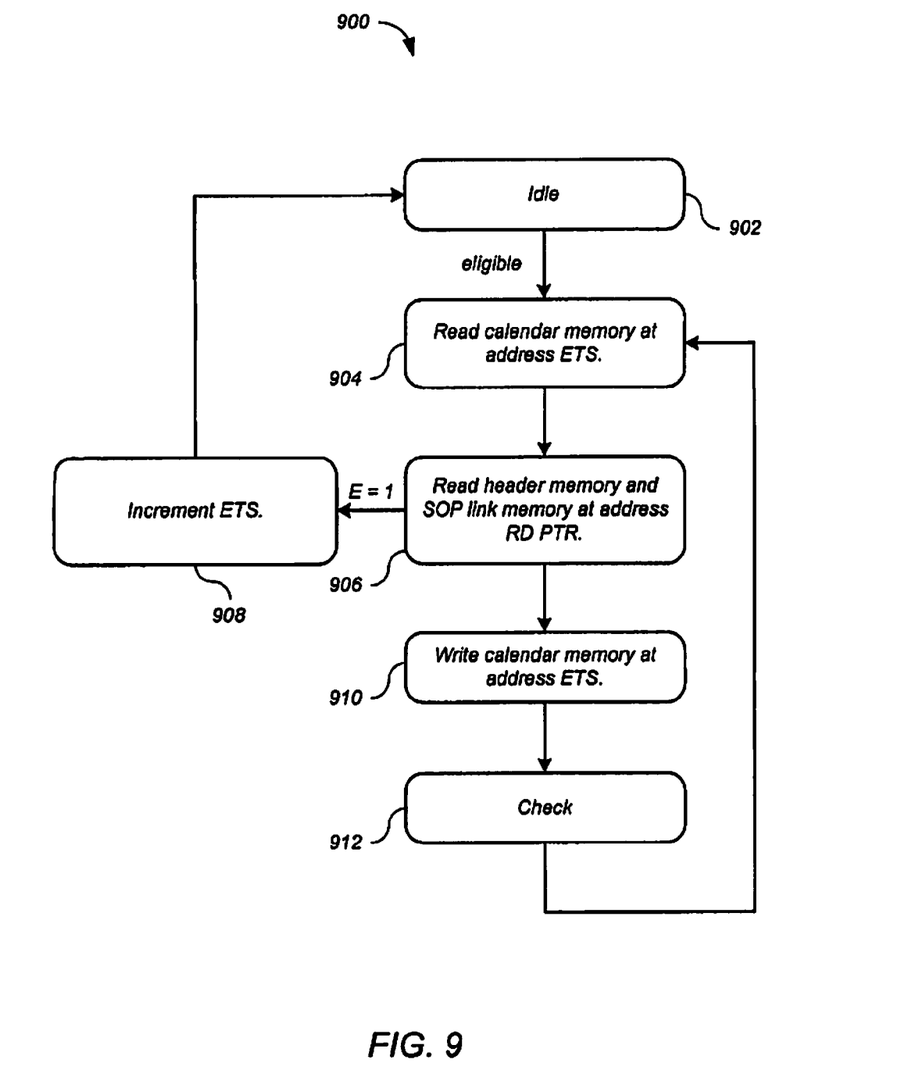
FIG. 9 shows a dequeue state machine implemented by the calendar dequeue controller of FIG. 6 according to one embodiment.

FIG. 9 shows a dequeue state machine 900 implemented by calendar dequeue controller 604 of FIG. 6 according to one embodiment. In an idle state 902, dequeue controller 604 waits for an eligible egress time to occur, that is, for the current timestamp to progress beyond ETS. When this occurs, state machine 900 moves to state 904, where dequeue controller 604 reads calendar memory 610 at address ETS (the eligible egress time for the packet). To prevent read/write contention, dequeue controller 604 reads calendar memory 610 only when enqueue state machine 800 is not in state 804. To prevent simultaneous read and write to the same memory address location, enqueue controller 602 and dequeue controller 604 access the same address ETS at different points in time. This can be guaranteed if Thold is sufficiently large. For example, in one embodiment, when Thold is zero, or is less than a minimum threshold, the calendar logic is bypassed altogether.

State machine 900 then moves to state 906, where the entry read in state 904 is returned to dequeue controller 604. If E=1 in the entry, state machine 900 moves to state 908, where ETS is incremented. State machine 900 then returns to idle state 902. But if at state 906 E=0, dequeue controller 604 reads header memory 612 and SOP link memory 614 at address RD PTR from the entry read in state 904. State machine 900 then moves to state 910, where dequeue controller 604 writes calendar memory 610 at address location ETS with values selected according to the values of WR PTR and RD PTR read in state 904. If WR PTR=RD PTR, the values are E=1, WR PTR=0, RD PTR=0 (in fact, WR PTR and RD PTR can be any value in this case because the entry is marked empty). If WR PTR≠RD PTR, the values are E=0, WR PTR=WR PTR, and RD PTR=NEXT PTR, where NEXT PTR is the value just read back from the SOP link memory 614.

State machine 900 then moves to check state 912, where dequeue controller 604 waits for downstream logic to indicate that it is ready to accept next packet. Even if the downstream logic is always ready, this state acts as filler state to align state machines 800 and 900. State machine 900 then returns to state 904.

Additional policies may be employed to discard, rearrange or manipulate packets as their descriptors enter or leave the calendar. As an example, certain conditions may result in multiple packets being assigned to the same ETS entry of the calendar. When this happens, a head or tail discard algorithm or the like may be implemented.

Figure 10:
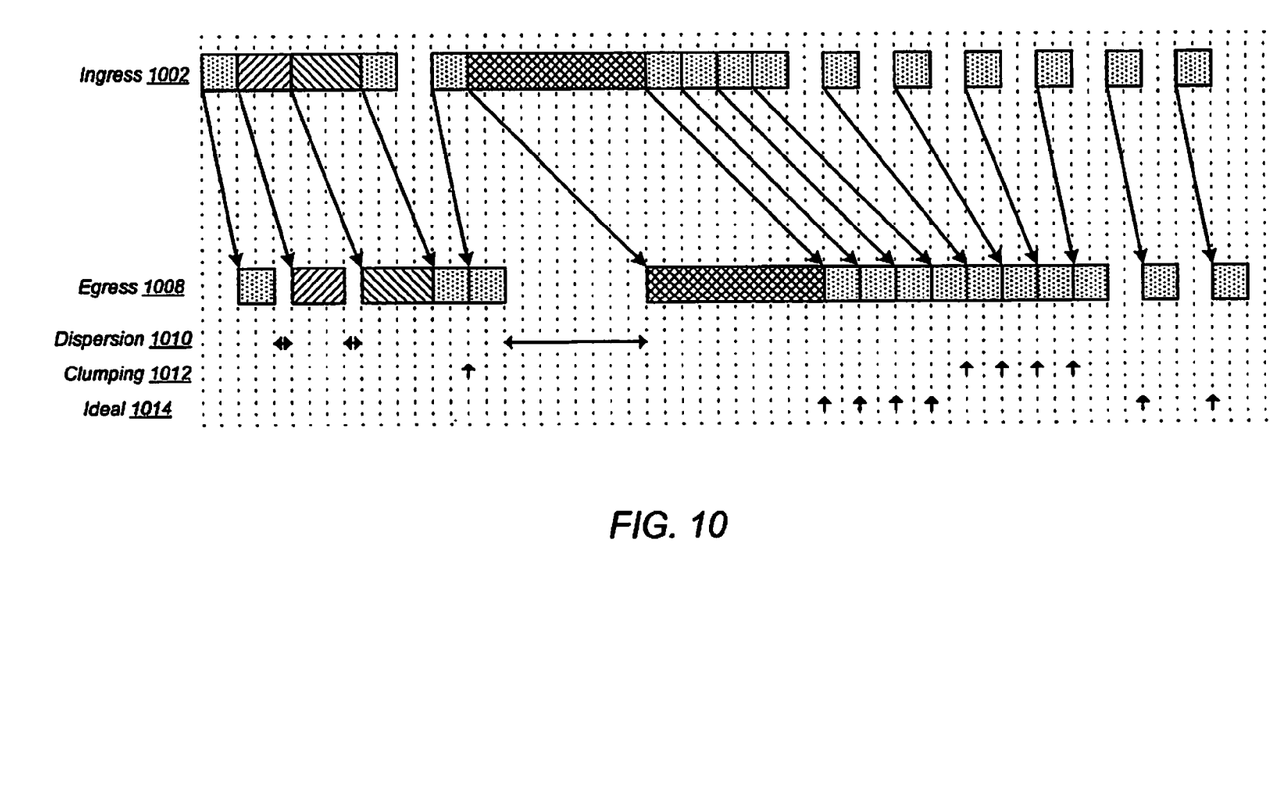
FIG. 10 is a timeline illustrating uncontrolled latency variations.
Figure 11:
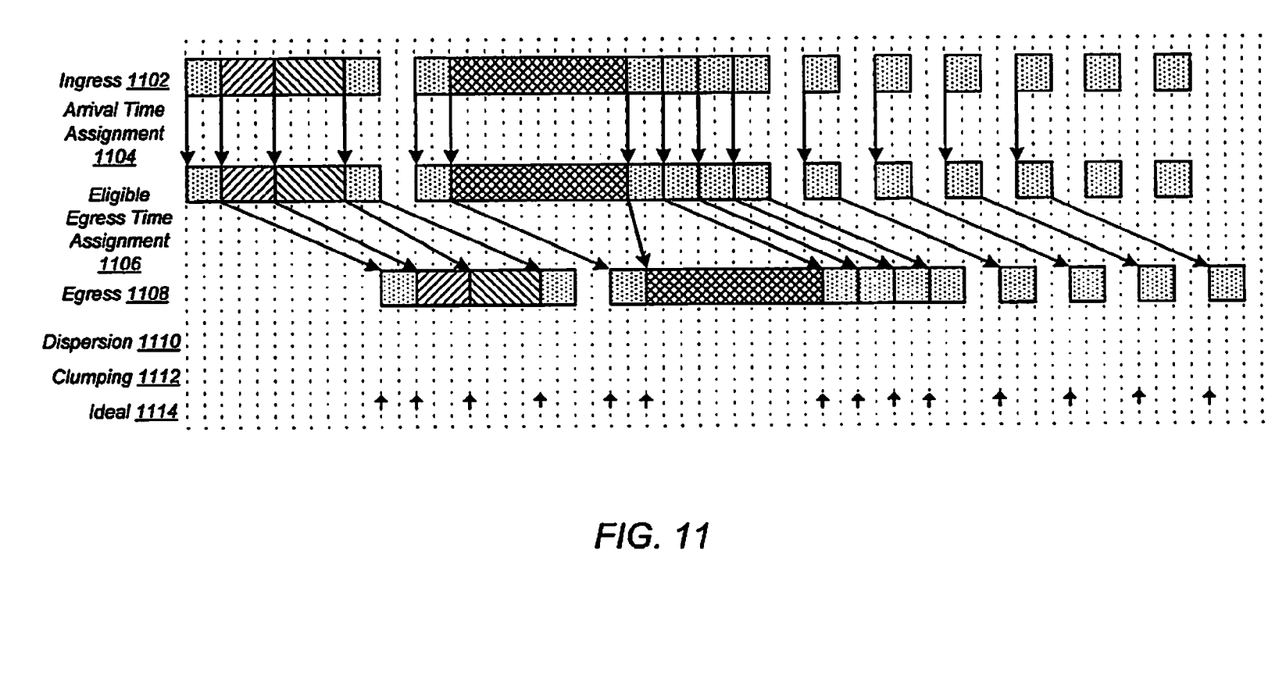
FIG. 11 is a timeline illustrating latency variations controlled according to embodiments described herein.

FIGS. 10 and 11 illustrate the effectiveness of the disclosed embodiments in controlling latency variations. FIG. 10 is a timeline illustrating uncontrolled latency variations. Each packet in a series of packets is shown as a rectangle, both on ingress at 1002 and on egress at 1008. Packet dispersion, where positive latency is introduced, is shown with horizontal arrows at 1010. Packet clumping, where negative latency is introduced, is shown with vertical arrows at 1012. Ideal latency, where latency is unchanged, is shown with vertical arrows at 1014. Significant packet dispersion and clumping can be seen in FIG. 10.

FIG. 11 is a timeline illustrating latency variations controlled according to embodiments described herein. Each packet in a series of packets is shown as a rectangle, both on ingress at 1102 and on egress at 1108. Also shown are arrival time assignments at 1104 and eligible egress time assignments at 1106. Packet dispersion is shown at 1110. Packet clumping is shown at 1112. Ideal latency, where latency is unchanged, is shown with vertical arrows at 1114. As can be seen in FIG. 11, packet dispersion and clumping have been eliminated.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, various modifications may be made without departing from the scope of the disclosure. For example, modifications such as changing the resolution of Tper, the organization of the memories (such as instances, entries, and widths), or flow packet (such as data path and operation sequences) are within the scope of the present disclosure. Accordingly, other implementations are within the scope of the following claims.

The invention claimed is:

1. A networking device configured to reduce delay jitter of a plurality of packets passing through the networking device, the networking device comprising:
   an input interface configured to receive the plurality of packets, wherein the plurality of packets includes a first packet;
   a packet memory configured to store the first packet;
   a timestamp module configured to generate a first timestamp corresponding to a time at which the input interface received the first packet;
   an egress module configured to store a first output time corresponding to the first packet, wherein the first output time is equal to a sum of the first timestamp and a fixed time interval, and wherein the fixed time interval is equal to a difference between (i) a first amount of time required by the networking device to receive a maximum-sized packet and (ii) a second amount of time required by the networking device to receive a minimum-sized packet; and
   an output interface configured to transmit the first packet to a destination networking device in response to a current timestamp from the timestamp module being greater than or equal to the first output time.

2. The networking device of claim 1, wherein the input interface is configured to generate a first descriptor for the first packet, and wherein the destination networking device is selected based on the first descriptor.

3. The networking device of claim 2, wherein the egress module comprises a descriptor memory configured to store the first descriptor.

4. The networking device of claim 3, wherein the egress module comprises an enqueue controller configured to select a first address in the descriptor memory based on the first output time, wherein the egress module is configured to store the first descriptor at the first address.

5. The networking device of claim 4, wherein the egress module comprises a dequeue controller configured to (i) determine a selected address in response to the current timestamp from the timestamp module, (ii) read a selected descriptor from the descriptor memory located at the selected address, and (iii) provide the selected descriptor to the output interface.

6. The networking device of claim 5, wherein the output interface transmits a selected packet from the packet memory in response to the selected descriptor from the dequeue controller, wherein the selected descriptor identifies the selected packet.

7. The networking device of claim 1, further comprising an eligible egress time module configured to calculate the first output time by adding the fixed time interval to the first timestamp.

8. The networking device of claim 1, wherein the input interface is configured to receive the plurality of packets from a source networking device.

9. A computer comprising:
   a first entity; and
   the networking device of claim 1, wherein the input interface is configured to receive the plurality of packets from the first entity.

10. The networking device of claim 1, wherein the networking device is selected from the group consisting of a switch, a bridge, and a router.

11. A method of operating a networking device to reduce delay jitter of a plurality of packets passing through the networking device, the method comprising:
- receiving the plurality of packets at the networking device, wherein the plurality of packets includes a first packet;
- storing the first packet;
- generating a first timestamp corresponding to a time at which the first packet was received at the networking device;
- storing a first output time corresponding to the first packet, wherein the first output time is equal to a sum of the first timestamp and a fixed time interval, and wherein the fixed time interval is equal to a difference between (i) a first amount of time required by the networking device to receive a maximum-sized packet and (ii) a second amount of time required by the networking device to receive a minimum-sized packet; and
- transmitting the first packet to a destination networking device in response to a current timestamp being greater than or equal to the first output time.

12. The method of claim 11, further comprising:
generating a first descriptor for the first packet; and
selecting the destination networking device based on the first descriptor.

13. The method of claim 12, further comprising storing the first descriptor in a memory.

14. The method of claim 13, further comprising selecting a first address based on the first output time, wherein the storing is performed to store the first descriptor into the memory at the first address.

15. The method of claim 14, further comprising:
- determining a selected address in response to the current timestamp; and
- reading a selected descriptor located at the selected address of the memory.

16. The method of claim 15, further comprising transmitting a selected packet, wherein the selected packet is identified by the selected descriptor.

17. The method of claim 11, further comprising calculating the first output time by adding the fixed time interval to the first timestamp.

18. The method of claim 11, wherein the plurality of packets are received from a source networking device.

19. The method of claim 11, wherein the plurality of packets are received from a first entity of a computer, wherein the computer includes the first entity and the networking device.

20. The method of claim 11, wherein the networking device is selected from the group consisting of a switch, a bridge, and a router.

* * * * *